United States Patent
Koskinen et al.

(10) Patent No.: US 11,491,592 B2
(45) Date of Patent: Nov. 8, 2022

(54) POLE STRUCTURE SUITABLE FOR PROVIDING A SMART POLE

(71) Applicant: Orbis Oy, Vantaa (FI)

(72) Inventors: Jari Koskinen, Helsinki (FI); Tero Laitinen, Espoo (FI); Mehis Laane, Tallinn (EE)

(73) Assignee: Orbis Oy, Vantaa (FI)

( * ) Notice: Subject to any disclaimer, the term of this patent is extended or adjusted under 35 U.S.C. 154(b) by 0 days.

(21) Appl. No.: 17/546,830

(22) Filed: Dec. 9, 2021

(65) Prior Publication Data
US 2022/0184758 A1    Jun. 16, 2022

(30) Foreign Application Priority Data
Dec. 10, 2020  (EP) ..................................... 20213107

(51) Int. Cl.
*B23P 19/04*   (2006.01)
*F21V 21/38*   (2006.01)

(52) U.S. Cl.
CPC ............... *B23P 19/04* (2013.01); *F21V 21/38* (2013.01)

(58) Field of Classification Search
CPC .................................. B23P 19/04; F21V 21/38
See application file for complete search history.

(56) References Cited

U.S. PATENT DOCUMENTS

| | | | | |
|---|---|---|---|---|
| 2,269,779 A | * | 1/1942 | Morten .................. | H01R 25/14 439/216 |
| 2,320,332 A | * | 5/1943 | Morten .................. | H01R 13/22 174/88 B |
| 5,340,331 A | * | 8/1994 | Bohlen .................. | H01R 31/02 439/502 |

(Continued)

FOREIGN PATENT DOCUMENTS

CN    201247857 Y  *  5/2009
CN    201639041 U  *  11/2010
(Continued)

OTHER PUBLICATIONS

Shen; Vertical type socket (CN-203787656-U); Aug. 20, 2014; EPO English Machine Translation, pp. 1-3 (Year: 2022).*
(Continued)

*Primary Examiner* — Bayan Salone
(74) *Attorney, Agent, or Firm* — Meunier Carlin & Curfman LLC

(57) ABSTRACT

A pole module for attachment to one or more adjacent pole modules to provide a pole assembly comprising two or more pole modules is disclosed here. The pole module comprises an elongated body that defines a cavity extending from a first end of the pole module to a second end of the pole module. The pole module further comprises a first installation interface for attaching the first end of the pole module to a second end of a first adjacent pole module and a second installation interface for attaching the second end of the pole module to a first end of a second adjacent pole module. The pole (Continued)

module further comprises a first connection interface and a second connection interface. A cabling arrangement is arranged in the cavity. The cabling arrangement comprises a plurality of cables connecting the first connection interface to the second connection interface.

16 Claims, 8 Drawing Sheets

(56) References Cited

U.S. PATENT DOCUMENTS

| | | | | |
|---|---|---|---|---|
| 6,296,522 | B1 * | 10/2001 | Ho | H01R 25/003 439/654 |
| 7,666,028 | B2 * | 2/2010 | Meleck | H01R 13/6272 439/502 |
| 11,209,603 | B2 * | 12/2021 | Erasmus | G02B 6/4416 |
| 2016/0053778 | A1 | 2/2016 | Kim | |
| 2020/0218022 | A1 * | 7/2020 | Erasmus | G02B 6/4472 |

FOREIGN PATENT DOCUMENTS

| | | | |
|---|---|---|---|
| CN | 203787656 U | * | 8/2014 |
| CN | 203787656 U | | 8/2014 |
| KR | 20110001921 A | * | 1/2011 |
| KR | 20110001921 U | | 2/2011 |
| KR | 20140002754 U | | 5/2014 |

OTHER PUBLICATIONS

Extended European Search Report dated May 21, 2021 in EP Application No. 20213107.4 (2 pages).

Notice from European Patent Office in regards with corresponding European patent application EP20213107; dated May 27, 2022; three pages.

* cited by examiner

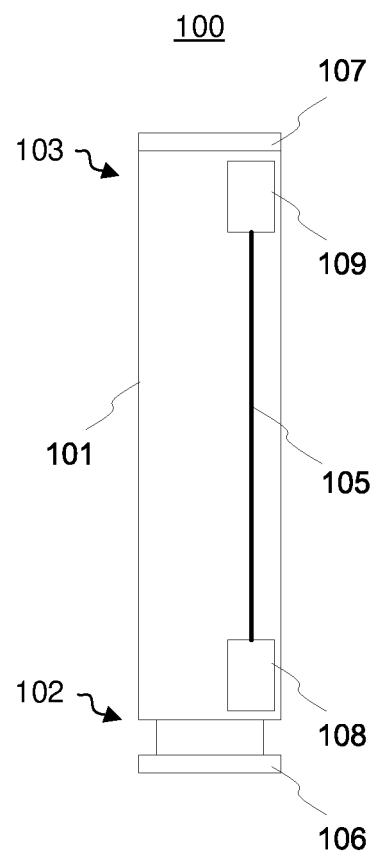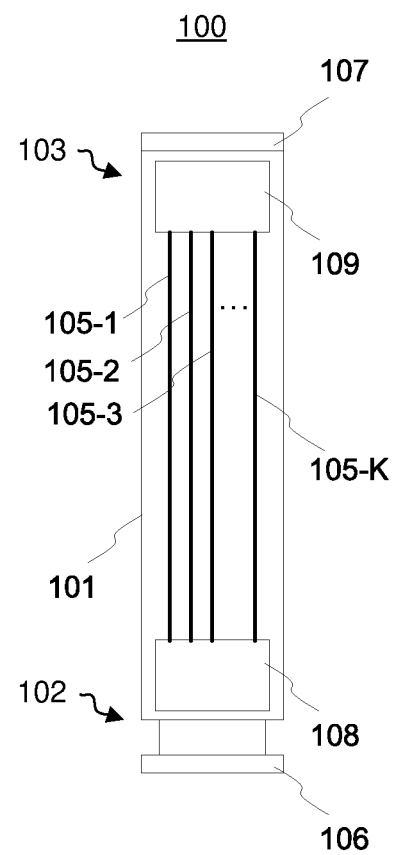
Figure 1A                                    Figure 1B

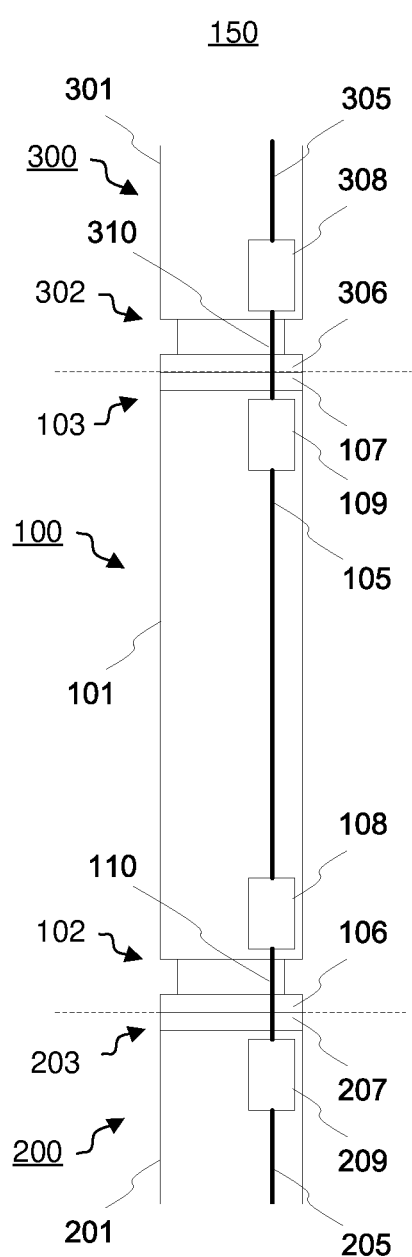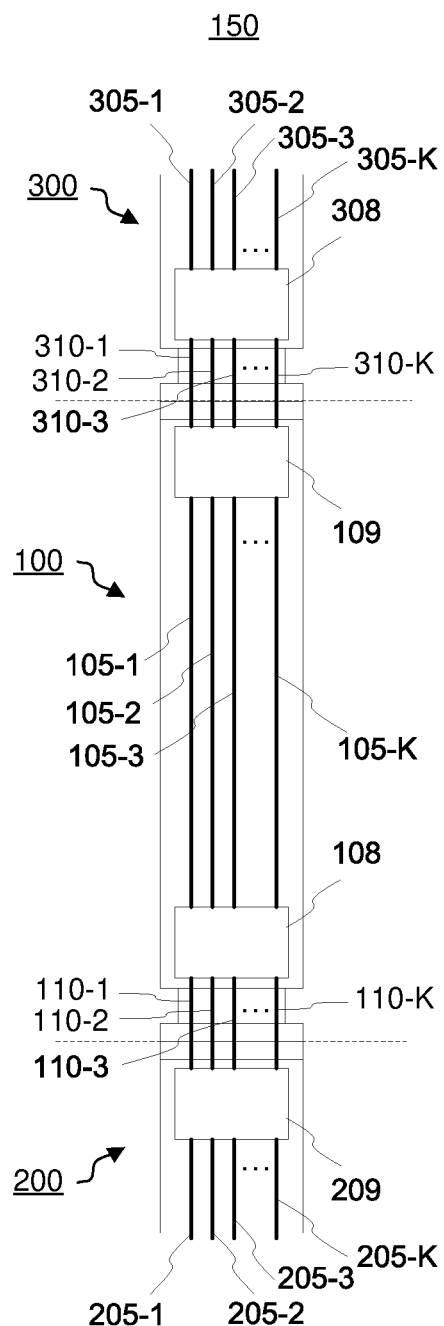
Figure 2A                    Figure 2B

500

Attach a first pole module to a second pole module via attaching a first installation interface of the first pole module to a second installation interface of the second pole module
502

Couple first one or more cables of a cabling arrangement of the second pole module via a second connection interface of the second pole module and via a first connection interface of the first pole module to corresponding one or more cables of a cabling arrangement of the first pole module
504

Couple second one or more cables of the cabling arrangement of the second pole module via the second connection interface of the second pole module to an electrical appliance, where the second one or more cables of the cabling arrangement of the second pole module are separate from the first one or more cables of the cabling arrangement of the second pole module
506

Figure 7

POLE STRUCTURE SUITABLE FOR PROVIDING A SMART POLE

PRIORITY CLAIM

This application claims priority of European patent application 20213107.4 filed Dec. 10, 2020 the contents of which is incorporated herein by reference.

TECHNICAL FIELD

The example and non-limiting embodiments of the present invention relate to a structure of pole or mast that is applicable for serving as an installation platform for outdoor lighting, for telecommunication transceivers, for electrical and/or communication appliances of other type etc. Such an entity may be referred to as a smart pole.

BACKGROUND

Many installations of outdoor electrical and/or communication appliances require installation at a certain height from a ground level to ensure or enable their proper operation. Typical examples of such appliances include luminaires for outdoor lighting, transceivers of a telecommunication or broadcasting system, surveillance cameras, sensor devices applied for meteorological measurements, solar panels, etc. While in some cases such appliances can by installed in existing structures such as walls of buildings, in may scenarios their installation at a proper operating height require usage of a pole, a post, a mast, a pylon, a tower or another vertical support structure that enable their positioning at a suitable height with respect to their environment.

Traditionally, vertical support structures of the type discussed above have traditionally served for a single primary purpose (such as outdoor lighting or telecommunications), while the support structure may have found further use as an installation platform for one or two additional electrical and/or communication appliances. Recent developments in the field of telecommunications especially in terms of bandwidth available for data transmission have paved the way also for increased number of services that may make use of such appliances, thereby calling for solutions where such support structures are designed to serve multiple purposes form the outset instead of serving a single primary purpose such as outdoor lighting or telecommunications. Without losing generality, such a vertical structure that enables installation of a plurality of such electrical and/or communication appliances may be referred to as a smart pole.

Due to increase and continuous evolution of various services that may make use of electrical appliances installed in a smart pole, the smart pole is required to accommodate electrical and/or communication appliances of different types in different numbers and to cater for their requirements for power supply and connectivity in a manner that makes it applicable for different usage scenarios.

SUMMARY

It is an object of the present invention to provide a pole structure that enables convenient and flexible installation at its usage location and that allows for convenient and flexible manner of connecting and disconnecting electrical and/or communication appliances of different types.

According to an example embodiment, a pole module for attachment to one or more adjacent pole modules to provide a pole assembly comprising two or more pole modules is provided, the pole module comprising: an elongated body that defines a cavity extending from a first end of the pole module to a second end of the pole module; a first installation interface for attaching the first end of the pole module to a second end of a first adjacent pole module and a second installation interface for attaching the second end of the pole module to a first end of a second adjacent pole module; a first connection interface and a second connection interface; and a cabling arrangement arranged in said cavity, comprising a plurality of cables connecting the first connection interface to the second connection interface, wherein the first connection interface enables selectively coupling each of said plurality of cables to one of the following: a corresponding cable of a cabling arrangement of the first adjacent pole module, a first electrical appliance mountable to the pole segment, and wherein the second connection interface enables selectively coupling each of said plurality of cables to one of the following: a corresponding cable of a cabling arrangement of the second adjacent pole module, a second electrical appliance mountable to the pole segment.

According to another example embodiment, a pole assembly comprising a first pole module according to the example embodiment described in the foregoing and a second pole module according to the example embodiment described in the foregoing is provided, wherein the first installation interface of the first pole module is attached to the second installation interface of the second pole module to arrange the first pole module and the second pole module into the pole assembly, and wherein first one or more cables of the cabling arrangement of the second pole module are coupled, via the second connection interface of the second pole module and the first connection interface of the first pole module, to corresponding one or more cables of the cabling arrangement of the first pole module.

According to another example embodiment, a method for assembling a first pole module according to the example embodiment described in the foregoing and a second pole module according to the example embodiment described in the foregoing into a pole assembly is provided, the method comprising: attaching the first pole module to the second pole module via attaching the first installation interface of the first pole module to the second installation interface of the second pole module; and coupling first one or more cables of the cabling arrangement of the second pole module via the second connection interface of the second pole module and via the first connection interface of the first pole module to corresponding one or more cables of the cabling arrangement of the first pole module.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1A schematically illustrates some logical elements of a pole module according to an example;

FIG. 1B schematically illustrates some logical elements of a pole module according to an example;

FIG. 2A schematically illustrates some logical elements of a pole assembly according to an example;

FIG. 2B schematically illustrates some logical elements of a pole assembly according to an example;

FIG. 7 illustrates a method according to an example.

DESCRIPTION OF SOME EMBODIMENTS

Figure 3A:
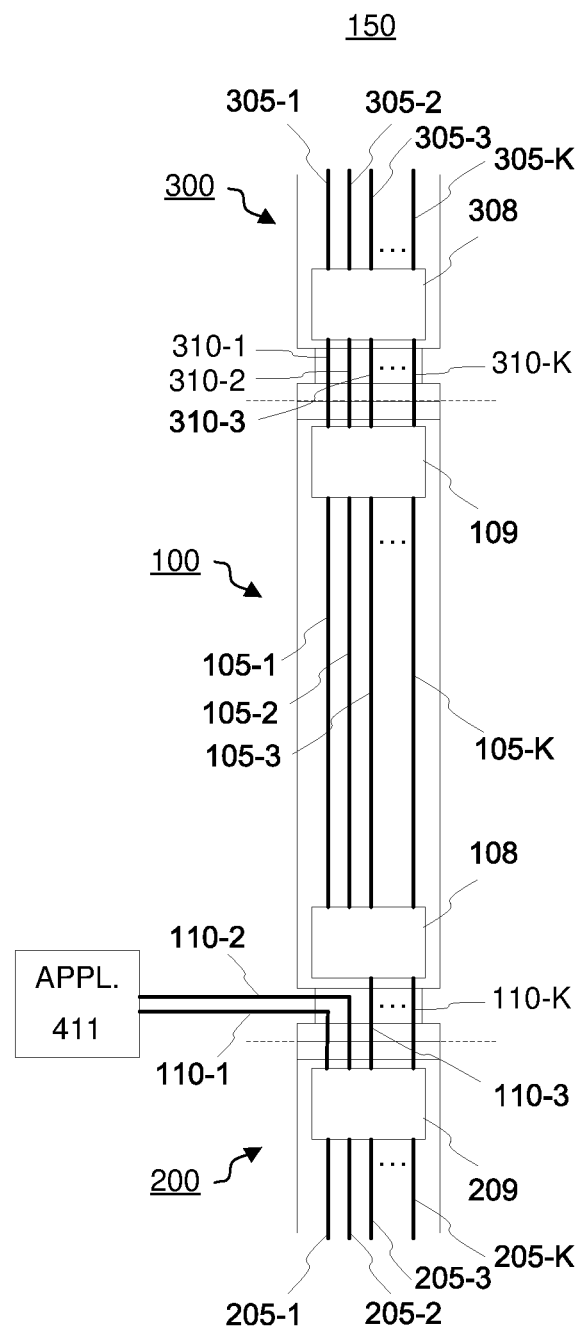
FIG. 3A schematically illustrates some logical elements of a pole assembly according to an example.

FIGS. 1A and 1B schematically illustrate some logical elements of a pole module 100 according to an example. The pole module 100 comprises an elongated body 101 that also serves as an outer casing of the pole module 100. The elongated body 101 defines a cavity therein for accommodating at least some of the other elements of the pole module 100, wherein the cavity within the elongated body 101 extends from a first end of the elongated body 101 to a second end of the elongated body 101. The first end of the elongated body 101 may also constitute a first end 102 of the pole module 100 and the second end of the elongated body 101 may constitute a second end 103 of the pole module 100.

The pole module 100 further comprises a cabling arrangement 105 provided in the cavity within the elongated body 101, as shown in FIG. 1A. The cabling arrangement 105 comprises a plurality of cables that serve to provide respective connections through the pole module 100, e.g. to connect the first end 102 of the pole module 100 to the second end 103 of the pole module 100. The schematic illustration of FIG. 1B shows the cabling arrangement 105 in further detail, showing cables 105-1, 105-2, 105-3, . . . , 105-K of the cabling arrangement 105 that represent the plurality of cables. In the following, any individual cable of the cabling arrangement 105 may be referred to as a cable 105-k. The plurality of cables may comprise a first plurality of data cables that enable data transfer through the pole segment 100 and a second plurality of power supply lines that enable power supply through the pole module 100. The first plurality of data cables may comprise one or more electrical cables and/or one or more optical cables. The second plurality of power supply lines may comprise one or more alternating current (AC) power supply lines and/or one or more direct current (DC) power supply lines.

The pole module 100 is intended for attachment to one or two adjacent pole modules 100, the two or more pole modules 100 thereby serving as building blocks that may be arranged into a pole assembly that comprises the two or more pole modules 100. The pole assembly may serve as a pole or a segment thereof. To this end, the elongated body 101 of the pole module 100 may comprise or may be made of durable and substantially rigid material that is suitable for outdoor use and that is able to bear the weight of further pole modules 100 above it when arranged into the pole assembly. As non-limiting examples in this regard, the elongated body 101 may comprise or it may be made of a suitable metal, alloy or composite material.

In a non-limiting example, the elongated body 101 may comprise a hollow tube having a predefined length and a substantially circular cross-section of substantially uniform width (e.g. a diameter) throughout its length, whereas in other examples the cross-section of the tube may have a shape different from a circle (such as rectangular, hexagonal, oval-shaped, an arbitrary shape, etc.) and/or the width of the tube may not by substantially constant throughout its length. Each end of the elongated body 101 may be open or may comprise an opening that enables making connections between the cabling arrangement 105 therein and respective cabling arrangements of any adjacent pole modules to be attached to the pole module 100. The elongated body 101 may be provided with a maintenance door that enables accessing the cavity therein to facilitate, for example, assembly of a plurality of pole modules 100 into the pole assembly as well as maintenance and repair operations.

The length of the pole module 100 may be chosen according to requirements set by the intended usage scenario of the pole assemblies constructed using two or more pole modules 100 in consideration of aspects that relate to storage, transport and handling of the pole modules 100. The length may be, for example, chosen from a range from half a meter to a couple of meters, e.g. one meter. The width (e.g. the diameter) of the elongated body 101 may be selected, for example, according to requirements set by the elements of the pole module 100 installed in the cavity within the elongated body 101. The width may be e.g. chosen from a range from 15 centimeters to a few tens of centimeters In order to facilitate straightforward installation of the pole modules into the pole assembly, the first end 102 of the pole module 100 may comprise a first installation interface 106 for attaching the pole module 100 to a second end of a first adjacent pole module and the second end 103 of the pole module 100 may comprise a second installation interface 107 for attaching the pole module to a first end of a second adjacent pole module. As an example in this regard, FIGS. 2A and 2B schematically illustrates some elements of a pole assembly 150 including the pole module 100, a first adjacent pole module 200 and a second adjacent pole module 300. In particular, FIGS. 2A and 2B schematically illustrate a portion of the pole assembly 150, including the pole module 100 together with a second end 203 of the first adjacent pole module 200 and a first end 302 of the second adjacent pole module 300. While the pole modules 200 and 300 may be identical to the pole module 100, respective different reference numbers are applied in referring to corresponding elements of these three pole modules for improved clarity of description.

In the example of FIGS. 2A and 2B, the first installation interface 106 of the pole module 100 is attached to a second installation interface 207 of the first adjacent pole module 200 and the second installation interface 107 of the pole module 100 is attached to a first installation interface 306 of the second adjacent pole module 300. In this regard, the first installation interfaces across the pole modules are similar to each other while the second installation interfaces across the pole modules are likewise similar to each other, arranged to enable secure attachment between the first installation interface of any pole module to the second installation interface of any other pole module. The first and second installation interfaces preferably enable detachable attachment between the pole modules 100, 200, 300. As a non-limiting example in this regard, the first and second installation interfaces may enable attachment using bolts and nuts.

While in terms of a mechanical structure of the pole module 100 the first and second installation interfaces 106, 107 are identical or at least similar across pole modules, the pole modules may differ from each other in terms of design (of other aspects) of the elongated body 101 without compromising the possibly of attaching any pole module to any other pole module. As an example in this regard, in some pole modules the elongated body 101 may be provided, on its exterior, a mounting arrangement for mounting one or more electrical (and/or other) appliances to the pole module 100. According to an example, the mounting arrangement may comprise a mounting rack, a mounting rail, etc. coupled to the exterior of the elongated body 101 or a mounting groove, a perforation, an aperture, etc. arranged on the exterior of the elongated body 101. An electrical appliance mounted to the pole module 100 may be further (communicatively) coupled to the cabling arrangement 105 of the pole module 100 or that of another pole module included in the pole assembly 150.

Along with the physical attachment between adjacent pole modules via the respective first and second installation interfaces, pole modules may be provided with respective connection interfaces to enable coupling the cables 105-$k$ of the cabling arrangement 105 in the pole module 100 to corresponding cables of the respective cabling arrangements of one or two adjacent pole modules. In this regard, the pole module 100 may comprise a first connection interface 108 in or close to its first end 102 and a second connection interface 109 in or close to its second end 103, where the cabling arrangement 105 of the pole module 100 is arranged to connect the first connection interface 108 to the second connection interface 109. In particular, each of the first and connection interfaces 108, 109 may comprise a respective plurality of sockets for plugging respective installation cabling, whereas each cable 105-$k$ of the cable arrangement 105 may serve to connect a respective socket of the first connection interface 108 to a corresponding socket of the second connection interface 109. In this regard, the first connection interfaces across the pole modules are similar to each other while the second connection interfaces across the pole modules are likewise similar to each other, arranged to enable straightforward coupling between the first connection interface of any pole module to the second connection interface of any other pole module attached thereto.

The schematic illustration of FIG. 2A shows the first connection interface 108 of the pole module 100 coupled to a second connection interface 209 of the first adjacent pole module 200 via installation cabling 110, thereby coupling the cabling arrangement 105 of the pole module 100 to a cabling arrangement 205 of the first adjacent pole module 200. Along similar lines, FIG. 2A shows the second connection interface 109 of the pole module 100 coupled to a first connection interface 308 of a second adjacent pole module 300 via installation cabling 310, thereby coupling the cabling arrangement 105 of the pole module 100 to a cabling arrangement 305 of the second adjacent pole module 300. In the example of FIG. 2A, the installation cabling 110 is detachably connectable to the first connection interface 108 of the pole module 100 and/or to the second connection interface 209 of the first adjacent pole module 200, whereas the installation cabling 310 is detachably connectable to the second connection interface 109 of the pole module 100 and/or to the first connection interface 308 of the second adjacent pole module 300. The installation cabling 110 may be, at least conceptually, considered as an element of the first connection interface 108 or as an element of the second connection interface 209, whereas the installation cabling 310 may be (again, at least conceptually) considered as an element of the second connection interface 109 or as an element of the first connection interface 308.

The cabling arrangements 205, 305 are similar to the cabling arrangement 105, mutatis mutandis, whereas the schematic illustration of FIG. 2B shows some further details of the cabling arrangements 105, 205, 305 and the installation cablings 110, 310 (while excluding some reference numbers shown in FIG. 2A for improved graphical clarity):

cables 205-1, 205-2, 205-3, . . . , 205-K of the cabling arrangement 205 represent the plurality of cables of the cabling arrangement 205, where any individual cable may be referred to as a cable 205-$k$;

cables 305-1, 305-2, 305-3, . . . , 305-K of the cabling arrangement 305 represent the plurality of cables of the cabling arrangement 305, where any individual cable may be referred to as a cable 305-$k$;

installation cables 110-1, 110-2, 110-3, . . . , 110-K of the installation cabling 110 represent the plurality of installation cables of the installation cabling 110, where any individual installation cable may be referred to as an installation cable 110-$k$;

installation cables 310-1, 310-2, 310-3, . . . , 310-K of the installation cabling 310 represent the plurality of installation cables of the installation cabling 310, where any individual installation cable may be referred to as an installation cable 310-$k$.

Hence, one end of the installation cable 110-$k$ may be connected to the respective socket of first connection interface 108 and the opposite end of the installation cable 110-$k$ may be connected to the respective socket of the second connection interface 209 to couple the cable 105-$k$ of the cabling arrangement 105 to the corresponding cable 205-$k$ of the cabling arrangement 205, whereas one end of the installation cable 310-$k$ may be connected to the respective socket of the second connection interface 109 and the opposite end of the installation cable 310-$k$ may be connected to the respective socket of the first connection interface 308 to couple the cable 105-$k$ of the cabling arrangement 105 to the corresponding cable 305-$k$ of the cabling arrangement 305. Hence, the installation cables 110-$k$, 310-$k$ enable providing a respective connection through the pole modules 200, 100, 300. The ends of each installation cable 110-$k$, 310-$k$ may be provided with respective plugs that are detachably connectable to the respective sockets of the first connection interfaces 108, 308 and the second connection interfaces 109, 209.

In the respective illustrations of FIGS. 1A, 1B, 2A and 2B each of the first connection interfaces 108, 308 and the second connection interfaces 109, 209 are shown as a respective single entity. In this regard, though, each of the first connection interfaces 108, 308 and the second connection interfaces 109, 209 is to be construed as a respective logical entity that may include or consist of respective one or more separate interface elements, each interface element serving to provide a respective subset of the sockets of the respective one of the connection interfaces 108, 109, 209, 308. As an example in this regard, the respective sockets of the first connection interface 108 and the second connection interface 109 that are coupled to each other by respective ones of the first plurality of data cables included in the cabling arrangement 105 may be provided in respective one or more first interface elements (e.g. respective 'data boxes') of the connection interfaces 108, 109, whereas the respective sockets of the first connection interface 108 and the second connection interface 109 that are coupled to each other by respective ones of the second plurality of power supply lines included in the cabling arrangement 105 may be provided in respective one or more second interface elements (e.g. respective 'power boxes') of the connection interfaces 108, 109, thereby separating those sockets of the connection interfaces 108, 109 that are applicable for data transfer from those that are applicable for power supply. Moreover, the one or more second interface elements for each of the connection interfaces 108, 109 may comprise respective separate second interface elements for AC power supply and for DC power supply (if applicable). Similar considerations are valid for the connection interfaces 209, 308 as well, mutatis mutandis.

While the examples described in the foregoing with references to FIGS. 2A and 2B illustrate the possibility of using the installation cablings 110, 310 to cascade the respective cabling arrangements 205, 105, 305 of the pole modules 200, 100, 300 to provide connections all the way through these pole modules, in other examples one or more of the installation cables 110-$k$ may be applied to couple respective one or more cables 105-$k$ of the cabling arrangement 105 to an electrical appliance (to be) mounted to the pole assembly 150 or to a pole including the pole assembly 150, thereby terminating the connections through the respective one or more cables 105-$k$ of the cabling arrangement 105 at the electrical appliance. In this regard, the respective installation cables 110-$k$ may be detachably connected to the electrical appliance. The one or more connections terminating at the electrical appliance may include one or more data cables to enable data transfer between the electrical appliance and one or more other entities and/or one or more power supply lines to provide the electrical appliance with operating power, depending on needs and requirements of the electrical appliance.

Along similar lines, in another example one or more of the installation cables 110-$k$ may be applied to couple respective one or more cables 205-$k$ of the cabling arrangement 205 to the electrical appliance (to be) mounted to the pole assembly 150 or to a pole including the pole assembly 150, thereby terminating the connections through the respective one or more cables 205-$k$ of the cabling arrangement 205 at the electrical appliance to enable data transfer and/or to provide operating power. Moreover, instead of or in addition to using one or more of the installation cables 110-$k$ for connecting the electrical appliance, one or more installation cables 310-$k$ may be applied to couple respective one or more cables 105-$k$ of the cabling arrangement 105 to an(other) electrical appliance (to be) mounted to the pole assembly 150 or to a pole including the pole assembly 150 or to couple respective one or more cables 305-$k$ of the cabling arrangement 305 to the (other) electrical appliance (to be) mounted to the pole assembly 150 or to a pole including the pole assembly 150. Also in this scenario, respective ones of the installation cables 110-$k$, 310-$k$ may be detachably connected to the electrical appliance.

Figure 3B:
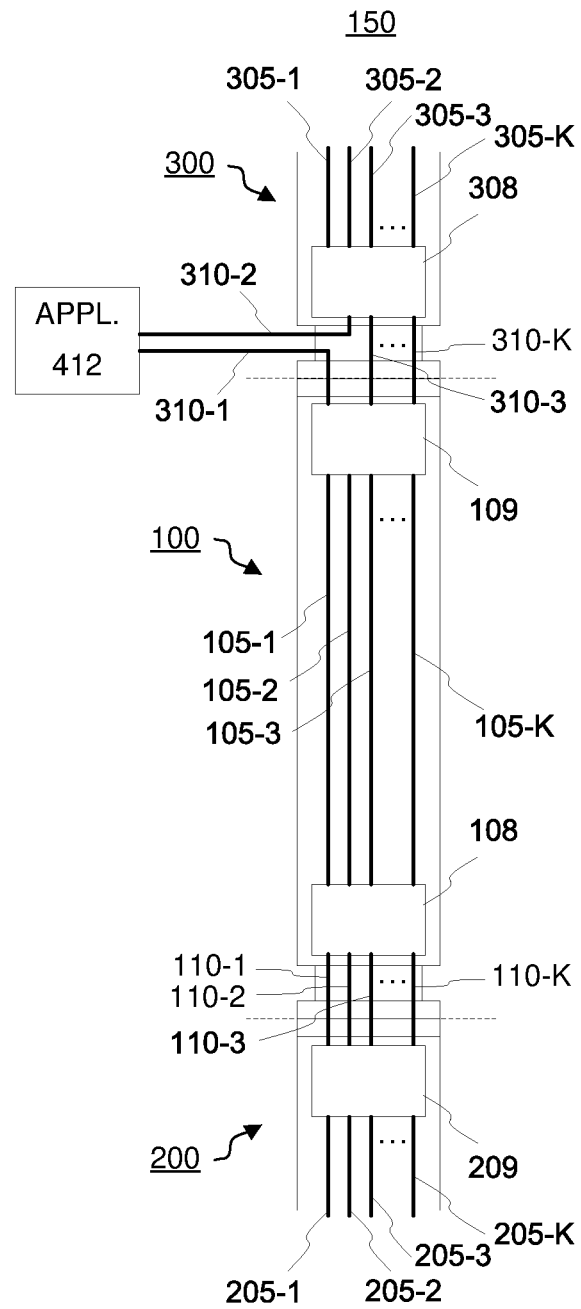
FIG. 3B schematically illustrates some logical elements of a pole assembly according to an example.

FIG. 3A schematically illustrates an example in this regard, where the installation cables 110-1 and 110-2 are applied to couple the cables 205-1 and 205-2 of the cabling arrangement 205 to an electrical appliance 411 instead of coupling the cables 205-1, 205-2 to the cables 105-1, 105-2 of the cabling arrangement 105, respectively, whereas the installation cables 110-3, . . . , 110-K are applied (as in the example of FIG. 2B) to connect the cables 205-3, . . . , 205-K to the cables 105-3, . . . , 105-K, respectively. Consequently, the respective connections provided via the cables 205-1 and 205-2 terminate at the electrical appliance 411 and the respective connections between the cables 205-1 and 105-1 and between the cables 105-2, 205-2 are not available for data transfer and/or power supply (as applicable). FIG. 3B schematically illustrates another example in this regard, where the installation cable 310-1 is applied to couple the cable 105-1 of the cabling arrangement 105 to an electrical appliance 412 instead of coupling the cable 105-1 to the cable 305-1 of the cabling arrangement 305 and the installation cable 310-2 is applied to couple the cable 305-2 of the cabling arrangement 305 to the electrical appliance 412 instead of coupling the cable 305-2 to the cable 105-2 of the cabling arrangement 105, whereas the installation cables 310-3, . . . , 310-K are applied (as in the example of FIG. 2B) to connect the cables 105-3, . . . , 105-K to the cables 305-3, . . . , 305-K, respectively. Consequently, the respective connections provided via the cables 105-1 and 305-2 terminate at the electrical appliance 412 and the respective connections between the cables 105-1 and 305-1 and between the cables 105-2 and 305-2 are not available for data transfer and/or power supply (as applicable).

Herein, the references to the electrical appliance are to be construed broadly, encompassing any electrical and/or communication appliance, such as luminaire for outdoor lighting, a transceiver of a telecommunication or broadcasting system, a surveillance camera, a sensor devices for meteorological measurements, a solar panel, or any other electrical appliance that is suitable for outdoor use and that may benefit from mounting or installation at a certain distance from the ground level.

The pole assembly 150 including two or more pole modules 100 described via the examples provided in the foregoing and/or in the following may serve as smart pole or a segment thereof. The pole modules 100 enable providing the pole assembly 150 as one of a suitable height by arranging a desired number of pole modules 100 into the pole assembly 150. Since the first and second installation interfaces 106, 107 and the first and second connection interfaces 108, 109 are similar (e.g. substantially identical) across the pole modules 100, the pole modules 100 are guaranteed to match each other both in terms of structure and in terms of connections available therethrough via the cabling arrangement 105. Moreover, the cabling arrangements 105 pre-installed in the pole modules 100 enable creating the connections through the pole modules 100 of the pole assembly 150 simply by using the installation cabling 110 to couple the first and second connection interfaces 108, 109 of adjacent pole modules 100 to each other. Yet further, the installation cabling 110 allows for connecting and disconnecting an electrical appliance to the pole assembly 150 at a desired position, e.g. at a desired height from the ground level, in a flexible manner:

If introducing an electrical appliance to the pole assembly 150 upon its construction, as an example, one may simply plug one or more installation cables 110-$k$ from the first connection interface 108 of a first pole module at a desired position of the pole assembly 150 to the electrical appliance and plug the remaining ones of the installation cables 110-$k$ to the second connection interface 109 of the adjacent pole module, thereby providing the electrical appliance with data transfer capability and/or power supply via the second connection interface 109 of the adjacent pole module as needed.

If introducing an electrical appliance to the pole assembly 150 after its construction, as an example, one may simply unplug one or more installation cables 110-$k$ from the first connection interface 108 of a first pole module at a desired position of the pole assembly 150 and plug these one or more installation cables 110-k to the electrical appliance instead to provide the electrical appliance with data transfer capability and/or power supply via the second connection interface 109 of the adjacent pole module as needed.

If removing an electrical appliance currently coupled via one or more installation cables 110-k to the second connection interface 109 of a first pole module, as an example, one may unplug the one or more installation cables 110-k from the electrical appliance and (re)plug these one or more installation cables to the first connection interface 108 of the adjacent pole module to disconnect the electrical appliance and to re-establish the respective connections between the first pole module and the adjacent pole module.

In the foregoing, the first connection interface 108 of the pole module 100 is described as an entity comprising a respective plurality of sockets that enable selectively coupling individual cables 105-k of the cabling arrangement 105 either to the second connection interface 109 of an adjacent pole module attached to the pole module 100 or to an electrical appliance (to be) coupled to the respective cables 105-k of the cabling arrangement 105 via usage of the respective installation cables 110-k. Along similar lines the second connection interface 109 of the pole module 100 is described as an entity comprising a respective plurality of sockets that enable selectively coupling the individual cables 105-k of the cabling arrangement 105 either to the first connection interface 108 of an adjacent pole module attached to the pole module 100 or to an electrical appliance (to be) coupled to the respective cables 105-k of the cabling arrangement via usage of the respective installation cables 110-k.

In a variation of the examples described in the foregoing, the sockets of the first connection interface 108 may be omitted and the first connection interface 108 may be a conceptual one, comprising respective end points or end segments of the cables 105-k of the cabling arrangement 105 at the first end 102 of the pole module 100. In such an example, the cables 105-k of the pole module 100 may be selectively connectable to (the respective sockets of) the second connection interface 109 of an adjacent pole module attached to the pole module 100 or to an electrical appliance (to be) coupled to the respective cables 105-k of the cabling arrangement 105 without the need to apply the dedicated installation cabling 110. In a another example in this regard, the second connection interface 109 of the pole module 100 may be the one provided as a conceptual one that is provided without the sockets described in the foregoing and where the respective end points or end segments of the cables 105-k of the cabling arrangement 105 at the second end 103 of the pole module 100 may be selectively connectable to (the respective sockets of) the first connection interface 108 of an adjacent pole module attached to the pole module 100 or to an electrical appliance (to be) coupled to the respective cables 105-k of the cabling arrangement 105 without the need to apply the dedicated installation cabling 110.

In the following, an example where the second connection interface 109 is provided without the respective arrangement of sockets is described in further detail, whereas the description readily generalizes into an alternative solution where the first connection interface 108 is the one provided without the respective socket arrangement instead, mutatis mutandis.

Figure 4A:
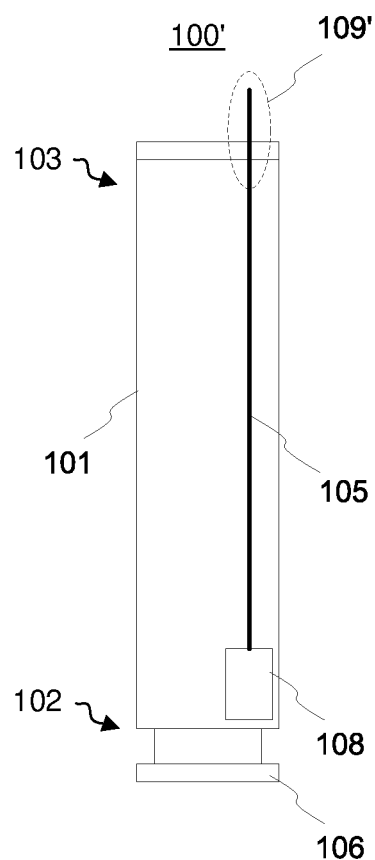
FIG. 4A schematically illustrates some logical elements of a pole module according to an example.
Figure 4B:
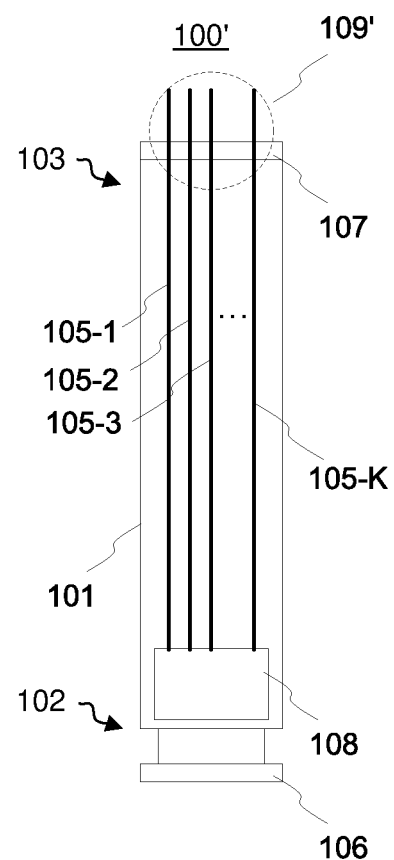
FIG. 4B schematically illustrates some logical elements of a pole module according to an example.

FIGS. 4A and 4B schematically illustrate some logical elements of a pole module 100' according to an example. The elements of the pole module 100 are similar to those apart from the second connection interface 109, which in the pole module 100' is replaced with a second connection interface 109'. Hence, in the pole module 100' the cable arrangement 105 connects the first connection interface 108 to the second connection interface 109'. Moreover, the second connection interface 109' may comprise a plurality of plugs arranged at the ends of respective one of the cables 105-k to enable making connections to the respective sockets of the first connection interface of an adjacent pole module or to an electrical appliance (to be) coupled via the cabling arrangement 105 of the pole module 100'. Consequently, there is no need for applying the separate installation cabling 110 for connecting the second connection interface 109' of the pole module 100' to the first connection interface 109 of an adjacent pole module and/or to the electrical appliance.

Figure 5A:
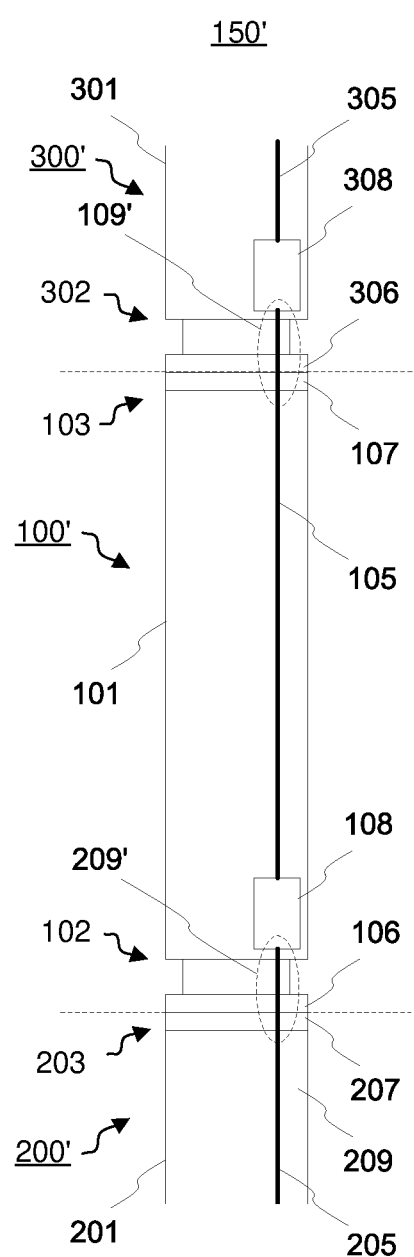
FIG. 5A schematically illustrates some logical elements of a pole assembly according to an example.
Figure 5B:
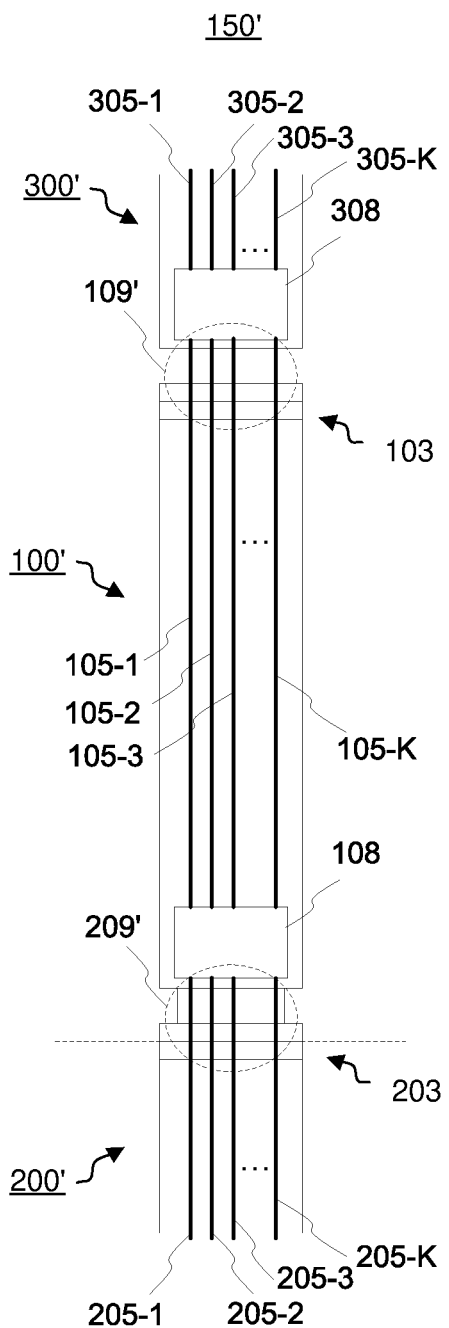
FIG. 5B schematically illustrates some logical elements of a pole assembly according to an example.

FIGS. 5A and 5B schematically illustrate a portion of the pole assembly 150', including the pole module 100' together with the second end 203 of a first adjacent pole module 200' and the first end 302 of a second adjacent pole module 300'. The elements of the pole segment 150' are similar to those of the pole segment 150 apart from the second connection interface 109' of the pole module 100' and a second connection interface 209' of the first adjacent pole module 200' (which is similar or identical to the second connection interface 109'). Consequently, the reference numbers in FIGS. 5A and 5B are the same as those applied in FIGS. 2A and 2B apart from those referring to the second connection interfaces 109', 209', to the pole modules 100', 200', 300', and to the pole segment 150' in general.

The schematic illustration of FIG. 5A shows the second connection interface 209' of the first adjacent pole module 200' coupled to the first connection interface 108 of the pole module 100 and the second connection interface 109' of the pole module 100' coupled to the first connection interface 308 of the second adjacent pole module 300'. Along the lines described above, a difference to the example of FIGS. 2A and 2B is that instead of using the dedicated installation cabling 110 to couple the cabling arrangement 205 of the first adjacent pole module 200' to the cabling arrangement 105 of the pole module 105, the second connection interface 209 of the first adjacent pole module 200' is directly connected to the first connection interface 109 of the pole module 100'. Along similar lines, instead of using the installation cabling 310 to couple the cabling arrangement 205 of the first adjacent pole module 200' to the cabling arrangement 105 of the pole module 105, the second connection interface 109' of the pole module 100' is coupled to the first connection interface 309 of the second adjacent pole module 300'. In the example of FIG. 5A, the second connection interface 209' of the first adjacent pole module 200' is detachably connectable to the first connection interface 108 of the pole module 100', whereas the second connection interface 109' of the pole module 100' is detachably connectable to the first connection interface 309 of the second adjacent pole module 300'.

The schematic illustration of FIG. 5B shows some further details of the cabling arrangements 105, 205, 305 (while omitting some reference numbers shown in FIG. 5A for improved graphical clarity):
  the second connection interface 209' of the first adjacent pole module 200' involves respective end points (or end segments) of the cables 205-1, 205-2, 205-3, . . . , 205-K at the second end 203 of the first adjacent pole module 200';
  the second connection interface 109' of the pole module 100' involves respective ends points (or end segments)

of the cables 105-1, 105-2, 105-3, . . . , 105-K at the second end 103 of the pole module 100'.

Therein, the end points of the cables 205-k may comprise respective plugs that are detachably connectable to the respective sockets of the first connection interface 108 of the pole module 100', thereby providing the second connection interface 209' of the first adjacent pole module 200' that is connectable to the first connection interface 108 of the pole module 100'. Along similar lines. the end points of the cables 105-k may comprise respective plugs that are detachably connectable to the respective sockets of the first connection interface 308 of the second adjacent pole module 300', thereby providing the second connection interface 109' of the pole module 100' that is connectable to the first connection interface 308 of the second adjacent pole module 300'.

The description in the foregoing with respect to providing the first connection interface 108 using the one or more first interface elements (e.g. respective 'data boxes') that include the respective sockets for the first plurality of data cables of the cabling arrangement 105 and one or more second interface elements (e.g. respective 'power boxes') that include the respective sockets for the second plurality of power supply lines of the cabling arrangement 105 (possibly further arranged into separate second interface elements for AC power supply and for DC power supply) for separating those sockets of the first connection interface 108 that are applicable for data transfer from those that are applicable for power supply applies also to the pole module 100'.

While the examples described in the foregoing with references to FIGS. 5A and 5B illustrate the possibility of using the respective end points or end segments of the cables 205, 105 (i.e. the respective second connection interfaces 209, 109) to cascade the respective cabling arrangements 205, 105, 305 of the pole modules 200, 100, 300 to provide connections all the way through these pole modules, in other examples the respective end points or end segments of one or more of the cables 105-k may be applied to couple respective one or more cables 105-k of the cabling arrangement 105 to an electrical appliance (to be) mounted to the pole assembly 150 or to a pole including the pole assembly 150, thereby terminating the connections through the respective one or more cables 105-k of the cabling arrangement 105 at the electrical appliance. In this regard, the respective end points or end segments of the cables 205, 105 applied to provide connections to an electrical appliance may be detachably connected thereto. In this regard, the one or more connections terminating at the electrical appliance may include one or more data cables to enable data transfer between the electrical appliance and one or more other entities and/or one or more power supply lines to provide the electrical appliance with operating power, depending on needs and requirements of the electrical appliance.

Figure 6:
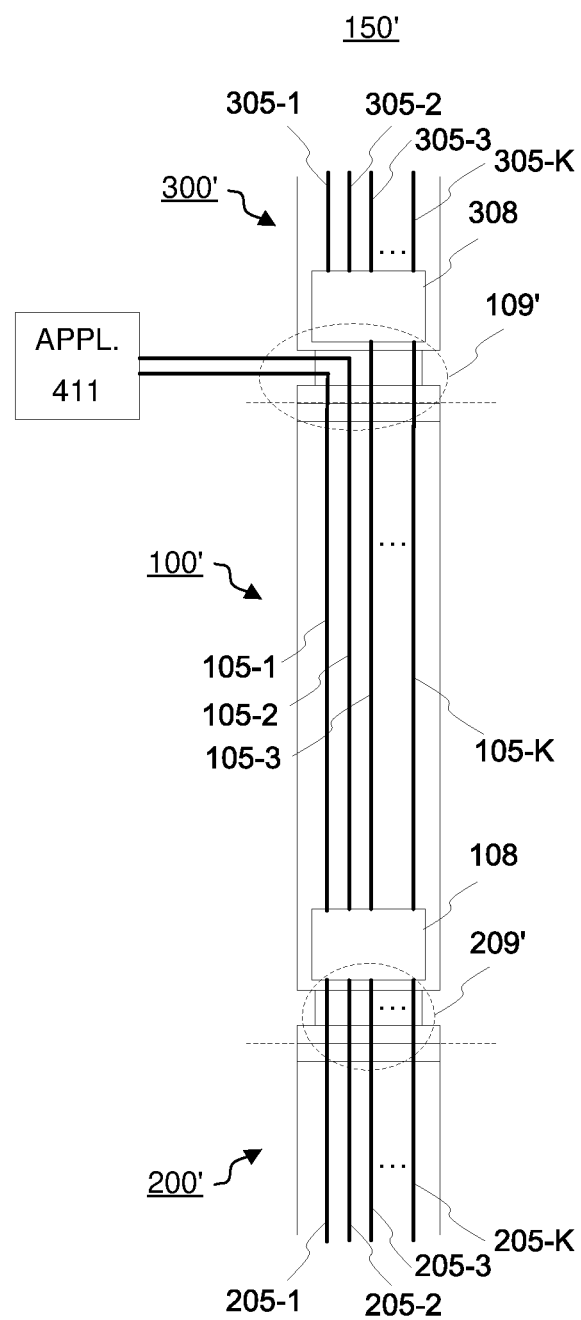
FIG. 6 schematically illustrates some logical elements of a pole assembly according to an example.

FIG. 6 schematically illustrates an example in this regard, where the respective end points or end segments of the cables 105-1 and 105-2 are applied to couple these cables of the cabling arrangement 105 to the electrical appliance 411 instead of coupling the cables 105-1, 105-2 to the cables 305-1, 305-2 of the cabling arrangement 305, respectively, whereas the respective end points or end segments of the cables 105-3, . . . 105-K are applied to couple these cables of the cabling arrangement 105 to the respective cables 303, . . . , 305-K of the cabling arrangement 305 of the second adjacent pole module 300'. Consequently, the respective connections provided via the cables 105-1 and 105-2 terminate at the electrical appliance 411 and the respective connections between the cables 105-1 and 305-1 and between the cables 105-2, 305-2 are not available for data transfer and/or power supply (as applicable).

While the examples described in the foregoing with references to FIGS. 2A, 2B, 3A, 3B, 5A, 5B and 6 illustrate an arrangement of the tree pole modules 100 into the pole assembly 150, in general case the pole assembly 150 may comprise or consist of one or more pole modules 100. A pole including the pole assembly 150 may further comprise, for example, a base module provided with a second installation interface similar to the second installation interfaces 107, 207 described above and with a second connection interface similar to the second connection interfaces 109, 109', 209, 209' described above to enable, respectively, attachment of the lowermost pole module 100 of the pole assembly 150 to the base module and connections between the cabling arrangement 105 of the lowermost pole module 100 and a cabling arrangement provided in the base module. In this regard, the cabling arrangement of the base module may enable connecting the first plurality of data cables of the cabling arrangement 105 of the lowermost pole module 100 to one or more external entities and connecting the second plurality of power supply lines of the cabling arrangement 105 of the lowermost pole module 100 to an external power supply.

While the examples described in the foregoing describe the pole modules 100, 100' and the pole assembly 150, 150' via their structure, a method of assembling two or more pole modules 100, 100' into the pole assembly 150, 150' likewise falls within the scope of the present disclosure. As an example in this regard, FIG. 7 depicts a flowchart illustrating a method 500 that pertains to operations for assembling the first pole module 100, 100 and the second pole module 200, 200' into the pole assembly 150, 150'. Respective operations described with references to blocks 502 to 506 pertaining to the method 500 may be implemented, varied and/or complemented in a number of ways, for example to account for examples pertaining to the structure of the pole modules 100, 100', 200, 200' and the pole assemblies 150, 150' provided in the foregoing and/or in the following.

The method 500 comprises attaching the first pole module 100, 100' to the second pole module 200, 200' via attaching the first installation interface 106 of the first pole module 100, 100' to the second installation interface 207 of the second pole module 200, 200', as indicated in block 502, and coupling first one or more cables 205-k of the cabling arrangement 205 of the second pole module 200, 200' via the second connection interface 209, 209' of the second pole module 200, 200' and via the first connection interface 108 of the first pole module 100, 100' to corresponding one or more cables 105-k of the cabling arrangement 105 of the first pole module 100, 100', as indicated in block 504. The method 500 may, optionally, further comprise coupling second one or more cables 205-k of the cabling arrangement 205 of the second pole module 200, 200' via the second connection interface 209, 209' of the second pole module 200, 200' to the electrical appliance 411, 412, where the second one or more cables 205-k of the cabling arrangement 205 of the second pole module 200, 200' are separate from the first one or more cables 205-k of the cabling arrangement 205 of the second pole module 200, 200', as indicated in block 506.

Throughout the present disclosure, references to coupling between, to and/or from the cables 105-k of the cabling arrangement 105 implicitly refer to establishing an electrical coupling for transfer of an electrical signal or electrical energy or establishing an optical coupling for transfer of optical signals, depending on the type of the underlying one of the cables 105-*k*.

Throughout the present disclosure, references are made to 'corresponding' cables of two elements of the pole assembly 150, e.g. cables 105-*k* of the cabling arrangement 105 and corresponding cables 205-*k* of the cabling arrangement 200 and cables 105-*k* of the cabling arrangement 105 and corresponding cables 110-*k* of the installation cabling 110. While readily implicit to a skilled reader, in this regard the correspondence refers to spatial and functional correspondence of respective cables in two elements of the pole assembly. As examples in this regard, assuming that the cabling arrangement 105 includes cables from cable 105-1 to cable 105-K and the cabling arrangement 205 includes cables from cable 205-1 to cable 205-K, respective pairs of corresponding cables between the cabling arrangements 100 and 200 include cables 105-1 and 205-1, cables 105-2 and 205-2, . . . , and cables 105-K and 205-K. Along similar lines, further assuming that the installation cabling 110 includes installation cables from cable 110-1 to 110-K, respective pairs of corresponding cables between the cabling arrangement 100 and the installation cabling 110 include cables 105-1 and 110-1, cables 110-2 and 110-2, . . . , and cables 105-K and 110-K.

Throughout the present disclosure, the term 'pole' is applied to refer to the vertical support structure for installing one or more electrical and/or communication appliances. This is, however, a non-limiting choice of wording or terminology and the description readily generalizes into one pertaining to a post, to a mast, to a pylon, to a tower or to another vertical structure of similar kind instead. Along similar lines, the term 'module' is applied to refer to building blocks of such a vertical installation structure as a non-limiting choice of wording or terminology and the description readily generalizes into one pertaining to a segment, to a section, to a portion, to a partition, etc. instead.

The invention claimed is:

1. A pole module for attachment to one or more adjacent pole modules to provide a pole assembly comprising two or more pole modules for mounting one or more electrical appliances, the pole module comprising:
   an elongated body that defines a cavity extending from a first end of the pole module to a second end of the pole module;
   a first installation interface for attaching the first end of the pole module to a second end of a first adjacent pole module and a second installation interface for attaching the second end of the pole module to a first end of a second adjacent pole module;
   a first connection interface and a second connection interface; and
   a cabling arrangement arranged in said cavity, comprising a plurality of cables connecting the first connection interface to the second connection interface,
      wherein the first connection interface comprises a plurality of sockets, each arranged at a respective end of a respective one of the plurality of cables for selectively coupling one of the following to the respective one of said plurality of cables: a corresponding cable of a cabling arrangement of the first adjacent pole module, a first electrical appliance mountable to the pole segment, and
      wherein the second connection interface comprises one of a plurality of sockets or a plurality plug, each arranged at a respective end of a respective one of the plurality of cables for selectively coupling one of the following to the respective one of said plurality of cables: a corresponding cable of a cabling arrangement of the second adjacent pole module, a second electrical appliance mountable to the pole segment.

2. The pole module according to claim 1, wherein said cabling arrangement comprises:
   a first plurality of data cables for data transfer via the pole module, and
   a second plurality of power supply lines for power supply via the pole module.

3. The pole module according to claim 2, wherein said first plurality of data cables comprises one or more of the following:
   one or more electrical cables,
   one or more optical cables.

4. The pole module according to claim 1, further comprising a mounting arrangement for mounting an electrical appliance to an exterior of the elongated body.

5. The pole module according to claim 1,
   wherein each of the first connection interface and the second connection interface comprise the respective plurality of sockets, where each cable of the cabling arrangement is arranged to couple a respective socket of the first connection interface to a corresponding socket of the second connection interface, and wherein the pole module comprises one or more of the following:
   a first installation cabling that comprises a plurality of first installation cables for providing the selective coupling from each cable of the cabling arrangement to the corresponding cable of the cabling arrangement of the first adjacent pole module or to the first electrical appliance via using a respective one of the first installation cables for coupling the respective socket of the first connection interface having the respective cable coupled thereto to one of the corresponding cable of the cabling arrangement of the first adjacent pole module or to the first electrical appliance, and
   a second installation cabling that comprises a plurality of second installation cables for providing the selective coupling from each cable of the cabling arrangement to the corresponding cable of the cabling arrangement of the second adjacent pole module or to the second electrical appliance via using a respective one of the second installation cables for coupling the respective socket of the second connection interface having the respective cable coupled thereto to one of the corresponding cable of the cabling arrangement of the second adjacent pole module or to the second electrical appliance.

6. The pole module according to claim 1,
   wherein the first connection interface comprises the plurality of sockets and the second connection interface comprises the respective plugs arranged at the ends of the cables, where each cable of the cabling arrangement is arranged to couple a respective socket of the first connection interface to the respective plug at the end of the respective cable,
   wherein the selective coupling from each cable of the cabling arrangement to the corresponding cable of the cabling arrangement of the first adjacent pole module or to the first electrical appliance is thereby provided via the socket of the first connection interface having the respective cable coupled thereto receiving a plug arranged at the end of a corresponding cable of the cabling arrangement of the first adjacent pole module or at the end of a cable coupled to the first electrical appliance, and wherein the selective coupling from each cable of the cabling arrangement to the corresponding cable of the cabling arrangement of the second adjacent pole module or to the second electrical appliance is thereby provided via plugging the respective plug at the end of the respective cable to a socket of a first connection interface of the second adjacent pole module coupled to the corresponding cable of the cabling arrangement of the second adjacent pole module or to the second electrical appliance.

7. A pole assembly for mounting one or more electrical appliances, the pole assembly comprising:

a first pole module according to claim 1, and a second pole module according to claim 1, wherein the first installation interface of the first pole module is attached to the second installation interface of the second pole module to arrange the first pole module and the second pole module into the pole assembly, and wherein first one or more cables of the cabling arrangement of the second pole module are coupled, via the second connection interface of the second pole module and the first connection interface of the first pole module, to corresponding one or more cables of the cabling arrangement of the first pole module.

8. The pole assembly according to claim 7, further comprising an electrical appliance mountable to the pole assembly, wherein second one or more cables of the cabling arrangement of the second pole module are coupled to the electrical appliance via the second connection interface of the second pole module, where the second one or more cables of the cabling arrangement of the second pole module are separate from the first one or more cables of the cabling arrangement of the second pole module.

9. The pole assembly according to claim 7, wherein the following applies to each of the first and second pole modules:

each of the first connection interface and the second connection interface comprise the respective plurality of sockets, where each cable of the cabling arrangement is arranged to couple a respective socket of the first connection interface to a corresponding socket of the second connection interface, and wherein the pole module comprises one or more of the following:

a first installation cabling that comprises a plurality of first installation cables (for providing the selective coupling from each cable of the cabling arrangement to the corresponding cable of the cabling arrangement of the first adjacent pole module or to the first electrical appliance via using a respective one of the first installation cables for coupling the respective socket of the first connection interface having the respective cable coupled thereto to one of the corresponding cable (of the cabling arrangement of the first adjacent pole module or to the first electrical appliance, and a second installation cabling that comprises a plurality of second installation cables for providing the selective coupling from each cable of the cabling arrangement to the corresponding cable of the cabling arrangement of the second adjacent pole module or to the second electrical appliance via using a respective one of the second installation cables for coupling the respective socket of the second connection interface having the respective cable coupled thereto to one of the corresponding cable of the cabling arrangement of the second adjacent pole module or to the second electrical appliance.

10. The pole assembly according to claim 9, comprising the second installation cabling, wherein the first one or more cables of the cabling arrangement of the second pole module are coupled to the corresponding one or more cables of the cabling arrangement of the first pole module via the second connection interface of the second pole module and via the first connection interface of the first pole module using respective first one or more second installation cables.

11. The pole assembly according to claim 10, further comprising the second electrical appliance mountable to the pole assembly, wherein second one or more cables of the cabling arrangement of the second pole module are coupled to the electrical appliance via the second connection interface of the second pole module using respective second one or more second installation cables that are separate from the first one or more second installation cables.

12. The pole assembly according to claim 11, wherein the following applies to each of the first and second pole modules:

the first connection interface comprises the plurality of sockets and the second connection interface comprises the respective plugs arranged at the ends of the cables, where each cable of the cabling arrangement is arranged to couple a respective socket of the first connection interface to the respective plug at the end of the respective cable, wherein the selective coupling from each cable of the cabling arrangement to the corresponding cable of the cabling arrangement of the first adjacent pole module or to the first electrical appliance is thereby provided via the socket of the first connection interface having the respective cable coupled thereto receiving a plug arranged at the end of a corresponding cable of the cabling arrangement of the first adjacent pole module or at the end of a cable coupled to the first electrical appliance, and wherein the selective coupling from each cable of the cabling arrangement to the corresponding cable of the cabling arrangement of the second adjacent pole module or to the second electrical appliance is thereby provided via plugging the respective plug at the end of the respective cable to a socket of a first connection interface of the second adjacent pole module coupled to the corresponding cable of the cabling arrangement of the second adjacent pole module or to the second electrical appliance.

13. The pole assembly according to claim 12, wherein the first one or more cables of the cabling arrangement of the second pole module are coupled to the corresponding one or more cables of the cabling arrangement of the first pole module via the second connection interface of the second pole module and via the first connection interface of the first pole module via plugging the respective plugs at the ends of the first one or more cables of the cabling arrangement of the second pole module to respective one or more sockets of the first connection interface of the first pole module.

14. The pole assembly according to claim 13, further comprising the second electrical appliance mountable to the pole assembly, wherein second one or more cables of the cabling arrangement of the second pole module are coupled to the second electrical appliance via the second connection interface f the second pole module via plugging the respective plugs at the ends of the second one or more cables of the cabling arrangement of the second pole module to the electrical appliance.

15. A method for assembling a first pole module according to claim 1 and a second pole module according to claim 1 into a pole assembly, the method comprising:
attaching the first pole module to the second pole module via attaching the first installation interface of the first pole module to the second installation interface of the second pole module; and
coupling first one or more cables of the cabling arrangement of the second pole module via the second connection interface of the second pole module and via the first connection interface of the first pole module to corresponding one or more cables of the cabling arrangement of the first pole module.

16. The method according to claim 15, further comprising coupling second one or more cables of the cabling arrangement of the second pole module via the second connection interface of the second pole module to an electrical appliance, where the second one or more cables of the cabling arrangement of the second pole module are separate from the first one or more cables of the cabling arrangement of the second pole module.

\* \* \* \* \*